United States Patent
Li

(10) Patent No.: US 7,764,451 B2
(45) Date of Patent: Jul. 27, 2010

(54) SYSTEM AND METHOD FOR USE IN DISPLAYING MODULATED LIGHT

(75) Inventor: Meng-Che Li, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 11/945,704

(22) Filed: Nov. 27, 2007

(65) Prior Publication Data
US 2009/0135511 A1    May 28, 2009

(51) Int. Cl.
*G02B 5/22* (2006.01)
*H04N 9/12* (2006.01)
*G03B 21/28* (2006.01)

(52) U.S. Cl. .................. 359/892; 359/891; 348/743; 353/84; 362/293

(58) Field of Classification Search .......... 359/891, 359/892; 353/84; 348/743; 362/293
See application file for complete search history.

(56) References Cited

U.S. PATENT DOCUMENTS

| 5,986,721 | A  | * | 11/1999 | Jones et al. | 348/743 |
| 6,398,389 | B1 | * | 6/2002  | Bohler et al. | 362/293 |
| 6,879,451 | B1 | * | 4/2005  | Hewlett et al. | 359/891 |

* cited by examiner

*Primary Examiner*—Audrey Y Chang
(74) *Attorney, Agent, or Firm*—Wade James Brady, III; Frederick J. Telecky, Jr.

(57) ABSTRACT

A system for use in displaying modulated light includes a light source operable to generate a light beam. The system also includes a color wheel for receiving the light beam. The color wheel comprises a plurality of translucent segments. The plurality of translucent segments comprises a first number of blue segments, the first number of red segments, and a second number of green segments wherein the first number is greater than the second number and the second number is at least one.

18 Claims, 3 Drawing Sheets

SYSTEM AND METHOD FOR USE IN DISPLAYING MODULATED LIGHT

TECHNICAL FIELD

This disclosure relates generally to display systems, and more particularly to a system and method for use in displaying modulated light.

BACKGROUND

Spatial light modulators used in sequential color display systems are capable of projecting image details from media sources such as HDTV, DVD, and DVI. One common technique in projecting image details involves the use of a color. Light from a light source passes through a particularly colored segment of a color wheel and emerges as that color. This colored light illuminates the spatial light modulator and a portion of it is reflected onto a display screen based on the image detail to be displayed. In order to reproduce a full color image, the segments of the color wheel are of different colors so that as it spins the color of light that is reflected onto the display screen changes. The color wheel makes several revolutions for every frame of the image to be displayed. The number of revolutions made per frame depends, in part, on the number of segments in the color wheel.

Two common problems with display systems utilizing a single spatial light modulator are motion contouring (PWM artifacting) and color breakup (rainbow effect). Motion contouring appears as false contours that arise when the eye is tracking a moving object. The false contour may be a ghost image at sharp edges or an artificial contour in smoothly varying regions. The rainbow effect appears as a momentary flash of rainbow-like striping typically trailing bright objects when looking from one side of the screen to the other quickly, or when quickly looking away from the TV to an off-screen object.

One technique used for improving color breakup is to increase the refresh rate or the number of color cycles. This may be done by increasing the speed of the color wheel or increasing the number color segments for the color wheel (e.g., two segments of each color instead of one segment of each color). Unfortunately this increases the impact of motion contouring. Conversely, decreasing the refresh rate (e.g., slowing down the color wheel or decreasing the number of color segments for the color wheel) in order to improve motion contouring by allowing more time to deploy grey level for each color of the color wheel will increase the color separation.

SUMMARY OF PARTICULAR EMBODIMENTS

In accordance with particular embodiments, a system for use in displaying modulated light includes a light source operable to generate a light beam. The system also includes a color wheel for receiving the light beam. The color wheel comprises a plurality of translucent segments. The plurality of translucent segments comprises a first number of blue segments, the first number of red segments, and a second number of green segments wherein the first number is greater than the second number and the second number is at least one.

Depending on the specific features implemented, particular embodiments may exhibit all, some, or none of the following technical advantages. A technical advantage of particular embodiments is a mitigation of the trade-off between the motion contouring of a two color cycle color wheel and the color breakup of a single color cycle color wheel. Accordingly, a display system may have improved color breakup compared to a traditional display system using a single color cycle color wheel and improved motion contouring compared to a traditional display system using a two color cycle color wheel.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments, and for further features and advantages thereof, reference is now made to the following description taken in conjunction with the accompanying drawings, in which.

DETAILED DESCRIPTION OF EXAMPLE EMBODIMENTS

A system and method have been developed that address the trade-off between color separation and motion contouring. In one embodiment, the system uses an asymmetric color wheel in which the number of green segments is less than the number of blue segments and the number of red segments. For example, in particular embodiments there may only be one green segment compared to two red segments and two blue segments.

Figure 1:
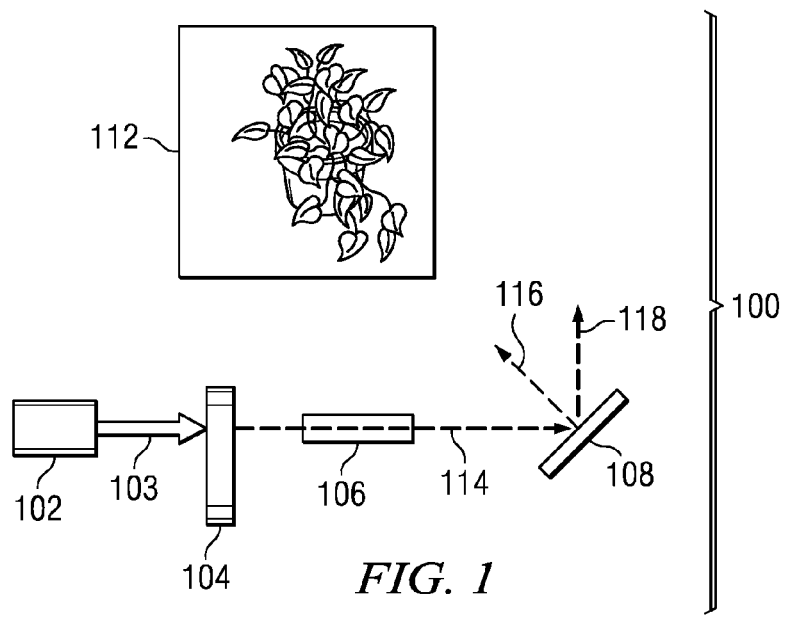
FIG. 1 is a block diagram of a portion of a display system using an asymmetric color wheel, according to one embodiment.

FIG. 1 is a block diagram of a portion of a display system using an asymmetric color wheel, according to one embodiment. In this embodiment, display system 100 includes light source 102, which may be capable of generating an illumination light beam 103, color wheel 104, which may be capable of filtering or frequency-selecting the spectrum of the light beam, integration rod 106, which may be capable of spatially integrating the light beam, and spatial light modulator 108, which may be capable of reflecting a portion of the light beam to create image 112. The order of these components is generally interchangeable and other alternative components to these may be utilized. It will be appreciated that system 100 may also include optical components (not explicitly shown), such as, for example, lenses, mirrors and/or prisms operable to perform various functions, such as, for example, filtering, directing, and focusing the light beam.

Light source 102 generally refers to any suitable light source, such as, for example, a metal halide lamp, a xenon arc lamp, a light emitting diode (LED), etc. In the example embodiment, light source 102 includes optics (not explicitly shown) capable of focusing the illumination light beam onto color wheel 104. Color wheel 104 may comprise any device capable of filtering or frequency selecting one of the desired colors (e.g., red, green, blue, yellow, cyan, magenta, white, etc.), in the path of the illumination light beam. Color wheel 104 enables the illumination light beam to be filtered so as to provide "field sequential" images. Color wheel 104 may be able to spin at a predetermined speed thus enabling system 100 to generate a rapid sequence of single colored images 112 that are perceived by a viewer as natural multi-colored images. In particular embodiments, color wheel 104 may comprise several segments, all or some of the segments may be of a particular color space. For example, color wheel 104 may comprise the colors of an RGB color space (e.g., red, green, and blue) or of a CMY color space (e.g., cyan, magenta, and yellow). In some embodiments color wheel 104 may additional colors besides those of a particular color space. For example, color wheel 104 may include cyan and yellow with the colors of an RGB color space. The number and color of segments may vary depending on the embodiment, as may the ratio of colors within color wheel 104. In particular embodiments some of the colors used in color wheel 104 may only be used once while other colors may be used more than once. For example, a color wheel may include the following sequence of color segments: red, green, blue, red, yellow, cyan, blue.

In the example embodiment of FIG. 1, illumination light beam 103 passes through color wheel 104 before entering integration rod 106. Integration rod 106 generally refers to any device capable of spatially integrating light beams. In the example embodiment, integration rod 106 spatially integrates the color filtered illumination light beam by internal reflection. System 100 may also include optics (not explicitly shown) capable of receiving the illumination light beam passing through integration rod 106 and focusing the illumination light beam onto spatial light modulator 108.

Spatial light modulator 108 may comprise, for example, a liquid crystal display, a light emitting diode modulator, or a liquid crystal on silicon display. In the illustrated embodiment, however, spatial light modulator 108 comprises a digital micro-mirror device (DMD). A DMD is a micro electro-mechanical device comprising an array of hundreds of thousands of tilting micro-mirrors. From the flat state, the micro-mirrors may be tilted, for example, to a positive or negative angle to alternate the micro-mirrors between an "on" state and an "off" state. For discussion purposes, the angle at which the mirrors may tilt will be measured from projection path 116 and may be designated as "theta." In particular embodiments, the micro-mirrors may tilt from +10 degrees to −10 degrees. In other embodiments, micro-mirrors may tilt from +12 degrees to −12 degrees. To permit the micro-mirrors to tilt, each micro-mirror attaches to one or more hinges mounted on support posts, and spaced by means of an air gap over underlying control circuitry. The control circuitry provides electrostatic forces, based at least in part on image data received from a source (e.g., a DVD or BLU-RAY disc player).

The electrostatic forces cause each micro-mirror to selectively tilt. Incident illumination light on the micro-mirror array is reflected by the "on" micro-mirrors along projection path 116 towards, for example, a screen. Additionally, illumination light beam 103 is reflected by the "off" micro-mirrors and directed along off-state light path 118 toward a light dump (not depicted). The pattern of "on" versus "off" mirrors (e.g., light and dark mirrors) forms image 112. As used in this document, the terms "micro-mirrors" and "pixels" are used inter-changeably.

In particular embodiments, the light generated by light source 102 includes white light comprised of red, green, and blue primary color light beams. The spinning color wheel 104 operates to divide the various colors of light beams in the white light to create a beam of light that changes from one primary color to the next in rapid sequence. Specifically, light source 102 and color wheel 104 cooperate to form a primary colored beam 114 that is directed at spatial light modulator 108.

For synchronization of color wheel 104 with spatial light modulator 108, color wheel 104 may be electrically coupled to a control module (not explicitly shown). In particular embodiments, the control module may receive a video signal to produce image 112. The control module may, accordingly, communicate with spatial light modulator 108 to synchronize the micro-mirrors of spatial light modulator 108 with color wheel 104. For example, image data representing the red portions of an image may be sent to spatial light modulator 108 when primary beam of light 114 is passed by the red color filter of color wheel 104. When received by spatial light modulator 108, a corresponding portion of the modulated red beam of light 114 is reflected towards a display screen along path 116. The process is repeated as color wheel 104 spins such that the green and blue filters sequentially pass through the path of primary beam of light 103. Thus, the image data representing the green portions of an image is sent to spatial light modulator 108 when primary beam of light 103 is passed by the green filter of color wheel 104, and the image data representing the blue portions of an image is sent to spatial light modulator 108 when primary beam of light 103 is passed by the blue color filter of color wheel 104. The eye of the viewer integrates the three primary color images giving the perception of a single full-color image 112.

Every color has its own unique characteristics, such as brightness, wavelength and frequency. Generally speaking, in a DMD based display device, the brighter the color the more significant its impact will be on motion contouring. In a traditional two cycle color wheel the negative impact to motion contouring of the brightest color is increased because the brightest color is used twice as often. However, simply reducing the number of cycles may make the color breakup worse because the reduced number of cycles means the refresh rate is lower.

In particular embodiments, color wheel 104 may include one green segment, two red segments, two blue segments, and one yellow segment. By providing for two cycles of red and blue and only one cycle of green and one cycle of yellow, this embodiment reduces the impact on motion contouring from the brightness of the green segment while still maintaining the color breakup benefit of having two cycles of red and blue segments. More specifically, because green is the brightest color of the three primary colors of the RGB color space it has the greatest impact on motion contouring (of the three primary colors). Accordingly, using only one green segment compared to two red segments and two blue segments reduces the impact of green on motion contouring while gaining the color breakup benefit of having multiple cycles of red and blue. Other color arrangements can be seen below in FIGS. 2A-2D.

FIGS. 2A-2D are representations of sample asymmetric color wheels, according to particular embodiments. Color wheel 200a of FIG. 2A includes red segments 210r1 and 210r2, blue segments 210b1 and 210b2, green segment 210g, yellow segment 210y, and cyan segment 210c. Color wheel 200b of FIG. 2B includes red segments 220r1 and 220r2, blue segments 220b1 and 220b2, green segment 220g, yellow segment 220y, and cyan segment 220c. Color wheel 200c of FIG. 2C includes red segments 230r1 and 230r2, blue segments 230b1 and 230b2, green segment 230g, yellow segment 230y, and cyan segment 230c. Color wheel 200d of FIG. 2D includes red segments 240r1 and 240r2, blue segments 240b1 and 240b2, green segment 240g, and yellow segment 240y.

Segments 210, 220, 230, and 240 are arranged within color wheels 200a, 200b, 200c and 200d, respectively, to illustrate some of the variety between different embodiments in the way segments may be arranged within different color wheels. For example, these embodiments illustrate that color wheels 200 are not limited to only the primary colors of red, green and blue. Besides color wheels having only the primary colored segments (red, blue and green), particular embodiments may include color wheels with additional color segments. For example, the depicted color wheels 200 include one or more "greenish" colors (e.g., yellow, cyan). Using these "greenish" colors in an asymmetric color wheel may further reduce the amount of color breakup in a displayed image. Other embodiments may comprise different colors and/or different arrangements of the colors. For example, some embodiments may include a clear or transparent segment to improve the brightness of the displayed image. Furthermore, some embodiments may involve different types or styles of colors wheels.

As can be seen, each of the depicted color wheels 200 include at least two red segments, two blue segments and one green segment. This is to take advantage of the color breakup benefit of a higher refresh rate for red and blue and the motion contouring benefit of a lower refresh rate for green. While color wheels 200a, 200b and 200c have the same colors and number of segments, these colors/segments are arranged in different orders and are of differing ratios. For example, both color wheel 200a and color wheel 200c have their "greenish" color segments (210y, 210c, and 230y, 230c) adjacent to one another while color wheel 200b has red segment 220r1 between its "greenish" color segments (220c and 220y). Color wheel 200d includes the same number of red, green, blue and yellow segments as color wheels 200a, 200b and 200c, but does not have a cyan segment. This variety helps to illustrate the flexibility that may be used in designing asymmetric color wheels. The flexibility may allow different embodiments to provide different coloring of a displayed image (e.g., image 112).

Figure 3:
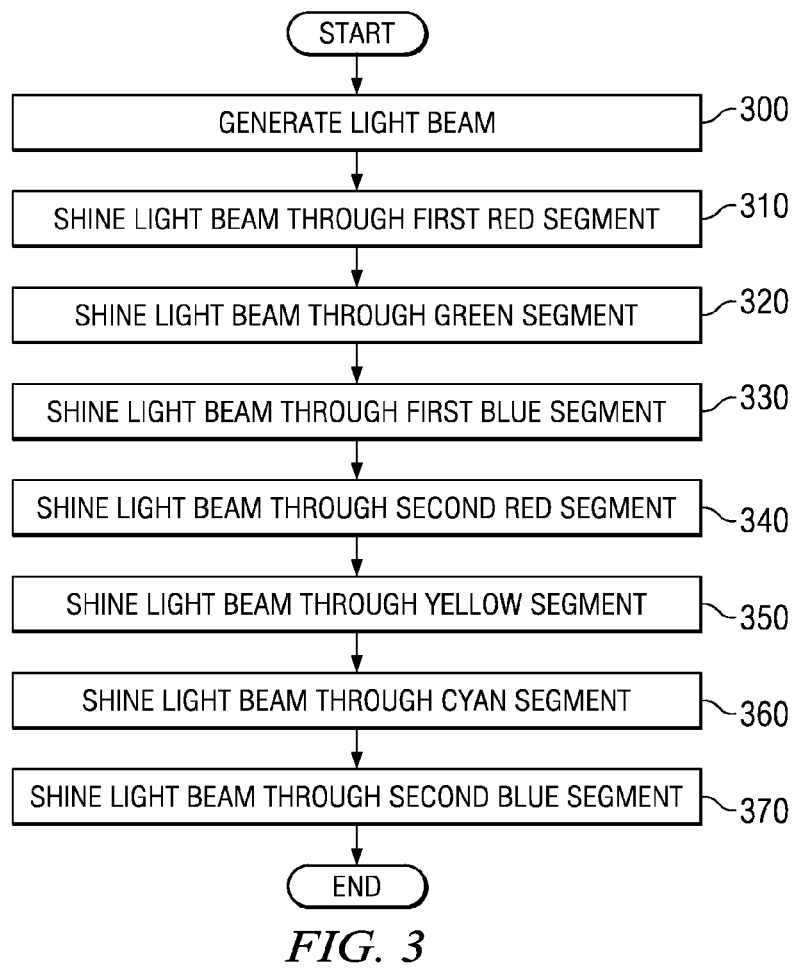
FIG. 3 illustrates a method for utilizing an asymmetric color wheel, according to particular embodiments.
Figure 2A:
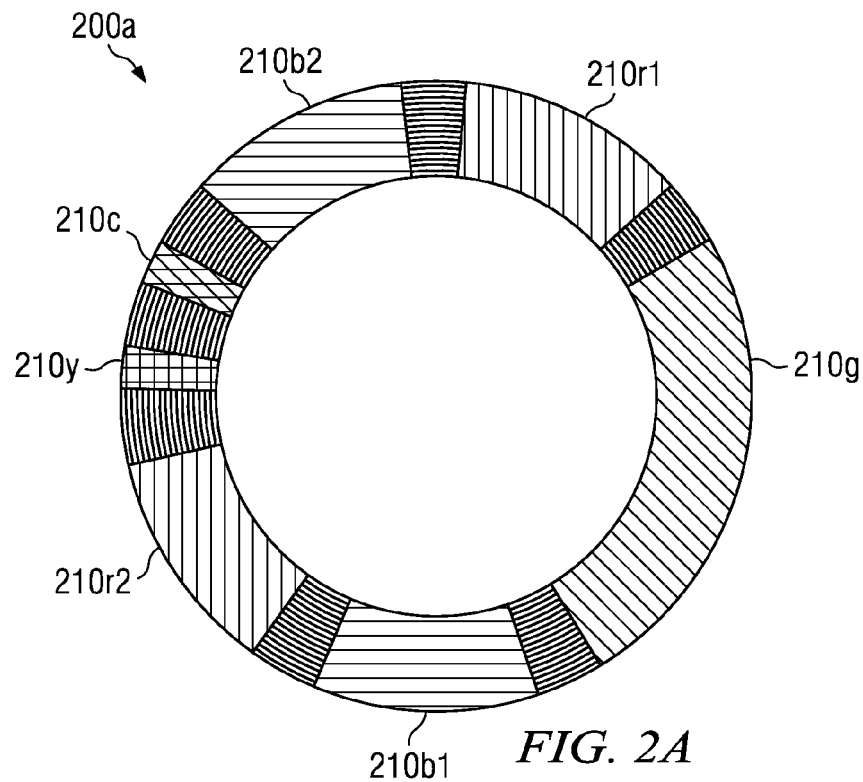
FIGS. 2A-2D are representations of sample asymmetric color wheels, according to particular embodiments.
Figure 2B:
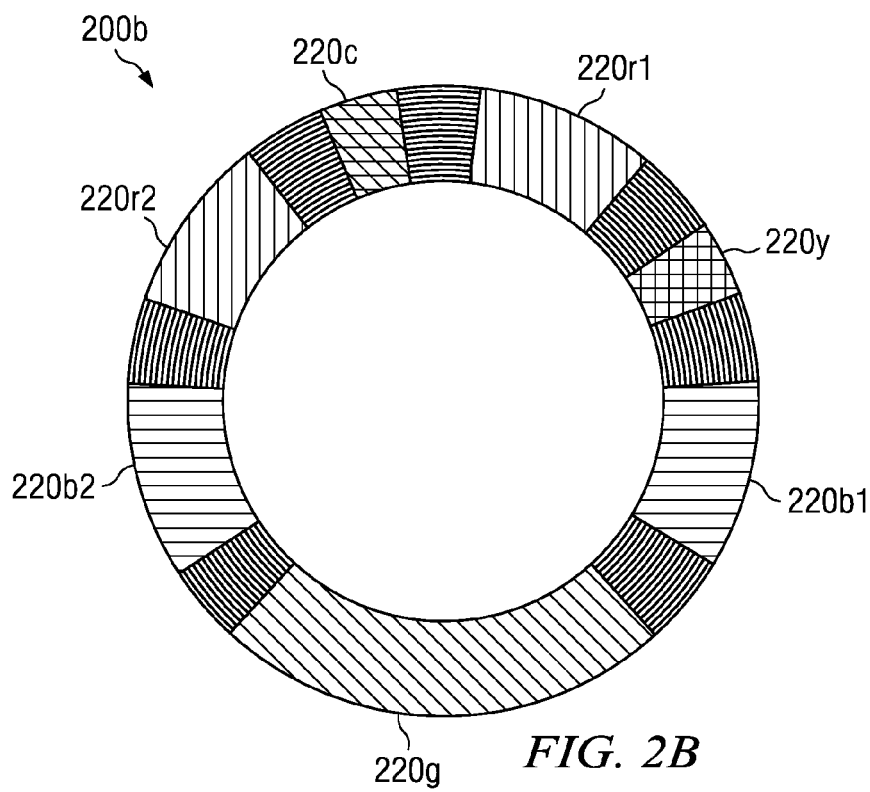
Figure 2C:
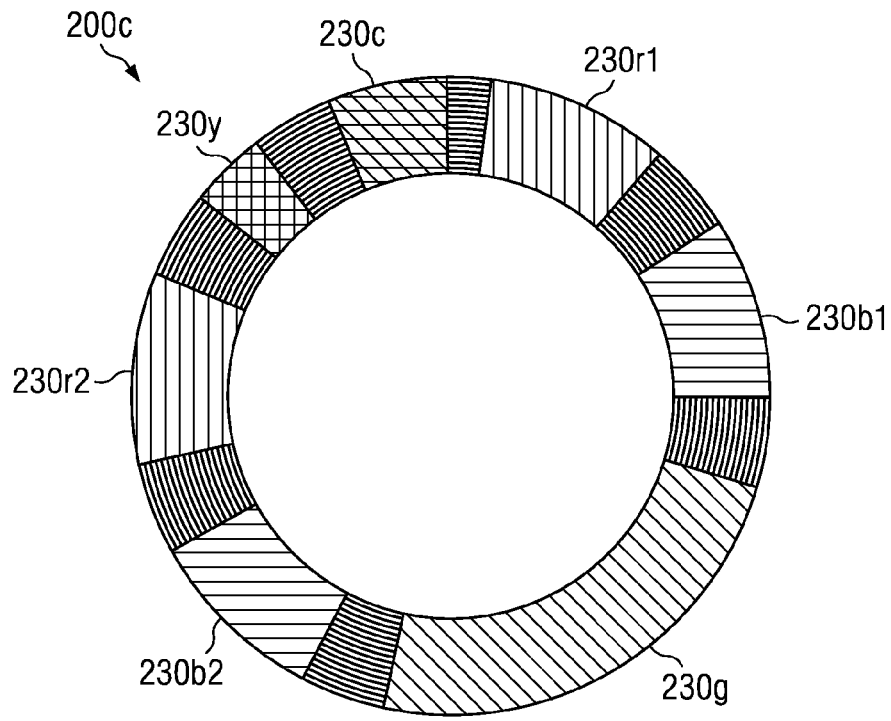
Figure 2D:
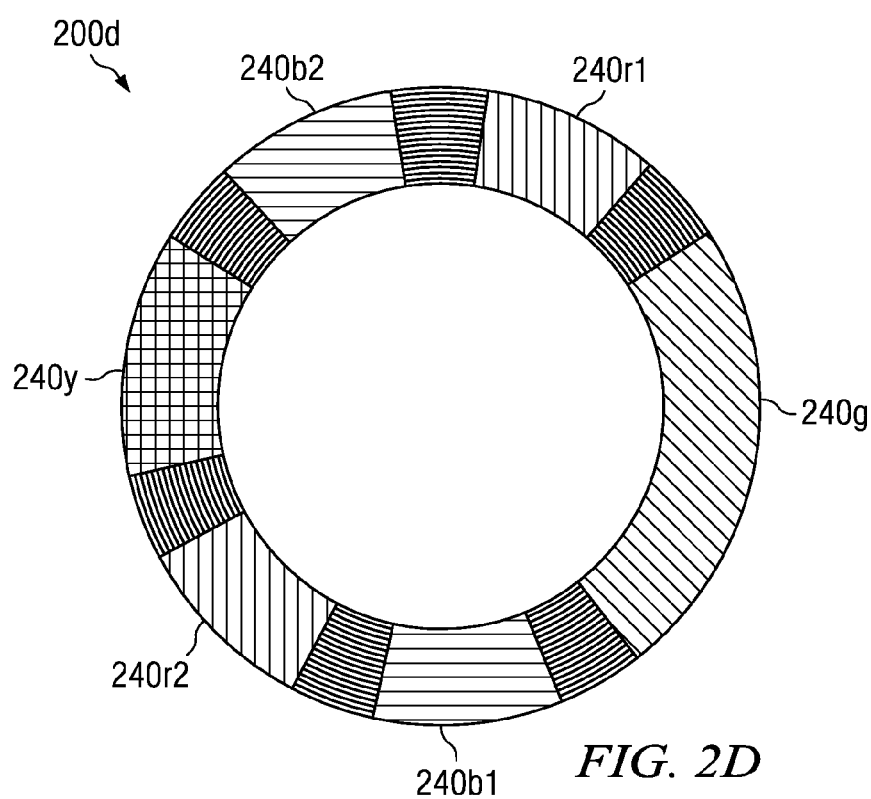

FIG. 3 illustrates a method for utilizing an asymmetric color wheel, according to particular embodiments. The method depicted in FIG. 3 is based on a particular color wheel having a particular number and arrangement of color segments. More specifically, the color wheel on which the method of FIG. 3 is based comprises red, green and blue segments of an RGB color space as well as cyan and yellow segments. As may be apparent other color wheels may have different color segments which may affect the number and order of the steps. The depicted method begins with step 300 where a light beam is generated. Depending on the embodiment the light beam may be generated from any of a variety of sources. For example, the light source may comprise a metal halide lamp, a xenon arc lamp, a light emitting diode (LED), a laser, or any other lamp, bulb or device operable to emit light. The light from the light source may be focused or otherwise manipulated by any of a variety of different optics. For example, a lens may be used to focus the light beam onto a digital micro-mirror device (DMD).

Once the light beam has been generated it may pass through a repeating cycle of different colored translucent segments of a color wheel. As discussed above, the number and arrangement of the translucent segments on the color wheel will determine the order in which the light beam passes through each translucent segment. In this embodiment the light beam first passes through a first red segment at step 310. Upon the light beam shining through the first red translucent segment it emerges as a red beam of light. This red beam of light may be focused or directed onto a DMD that may selectively reflect a portion of the beam to a display surface based on an image to be displayed.

This is repeated at step 320 for a green segment, step 330 for a blue segment, step 340 for a second red segment, step 350 for a yellow segment, step 360 for a cyan segment 360, and step 370 for a blue segment. By repeating steps 310 through 370 in quick succession (and reflecting them off of a DMD as with the red beam of light) a full color image composed of the individual portions of each color may be created. By passing the light beam through only one green segment but through two blue segments and two red segments it may be possible to reduce the effect of motion contouring compared to a traditional two-cycle color wheel (e.g., a color wheel using two segments of red, green and blue) and to reduce the effect of color breakup compared to a traditional single-cycle color wheel (e.g., a color wheel using only one segment of red, green and blue).

Modifications, additions, or omissions may be made to the method depicted in FIG. 3. The flowchart may include more, fewer, or other steps. For example, some color wheels may only use the three primary colors. Accordingly, steps 350 and 360 may be omitted. Additionally, steps may be performed in any suitable order and by any suitable component.

Although particular embodiments have been described a myriad of changes, variations, alterations, transformations, modifications and alternate embodiments may be suggested to one skilled in the art, and it is intended that the present invention encompass such changes, variations, alterations, transformations, and modifications as falling within the scope of the appended claims.

What is claimed is:

1. A system for use in displaying modulated light, comprising:
   a light source operable to generate a light beam; and
   a color wheel for receiving the light beam, the color wheel comprising at least five translucent segments, each translucent segment being one of three colors of a first color space, the three colors including a brightest color and two other colors, wherein a first number of the translucent segments have the brightest color, a second number of the translucent segments have a first color of the two other colors, and a third number of the translucent segments have a second color of the two other colors, wherein the first number is less than the second number and the third number and at least one.

2. The system of claim 1, wherein:
   the color wheel comprises only five translucent segments;
   the brightest color is green;
   the first color of the two other colors is blue; and
   the second color of the two other colors is red.

3. The system of claim 1, wherein:
   the color wheel further comprises at least one translucent segment that has an additional color other than the three colors of the first color space;
   the brightest color is green;
   the first color of the two other colors is blue;
   the second color of the two other colors is red; and
   the at least one additional color is yellow.

4. The system of claim 1, wherein:
   the color wheel further comprises at least one translucent segment that has an additional color other than the three colors of the first color space;
   the brightest color is green;
   the first color of the two other colors is blue;
   the second color of the two other colors is red; and
   the at least one additional color is cyan.

5. The system of claim 1, wherein:
   the color wheel further comprises at least two translucent segment that each have one of two different additional colors other than the three colors of the first color space;
   the brightest color is green;
   the first color of the two other colors is blue;
   the second color of the two other colors is red;

a first color of the two different additional colors is cyan; and a second color of the two different additional colors is yellow.

6. The system of claim 1, wherein the color wheel further comprises at least one transparent segment.

7. A system for use in displaying modulated light, comprising:

a light source operable to generate a light beam; and a color wheel for receiving the light beam, the color wheel comprising a plurality of translucent segments, the plurality of translucent segments comprising a first number of blue segments, the first number of red segments, and a second number of green segments wherein the first number is greater than the second number and the second number is at least one.

8. The system of claim 7, wherein the color wheel comprises only two red segments, only two blue segments and only one green segment.

9. The system of claim 7, wherein the color wheel further comprises at least one yellow segment.

10. The system of claim 7, wherein the color wheel further comprises at least one cyan segment.

11. The system of claim 7, wherein the color wheel further comprises at least one yellow segment and at least one cyan segment.

12. The system of claim 7, wherein the color wheel further comprises at least one transparent segment.

13. A method for use in displaying modulated light, comprising, producing a light beam that sequentially switches between a plurality of colors during a cycle, the plurality of colors comprising at least red, blue and green, wherein a blue light beam is produced a first number of times during the cycle, a red light beam is produced the first number of times during the cycle, and a green light beam is produced a second number of times during the cycle, the first number is greater than the second number and the second number is at least one.

14. The method of claim 13, wherein:

the plurality of colors comprises only red, blue and green;

the first number is two; and the second number is one.

15. The method of claim 13, wherein the plurality of colors further comprises yellow, and a yellow light beam is produced at least one time during the cycle.

16. The method of claim 13, wherein the plurality of colors further comprises cyan, and a cyan light beam is produced at least one time during the cycle.

17. The method of claim 13, wherein the plurality of colors further comprises yellow and cyan, and a yellow light beam is produced at least one time during the cycle and a cyan light beam is produced at least one time during the cycle.

18. The method of claim 13, wherein the plurality of colors further comprises white, and a white light beam is produced at least one time during the cycle.

* * * * *